United States Patent [19]

Word et al.

[11] Patent Number: 4,738,781

[45] Date of Patent: Apr. 19, 1988

[54] SYSTEM AND PROCESS FOR PROCESSING USED EMULSION COOLANT

[75] Inventors: William W. Word; Kenneth J. Lewandowski, both of Arvada; Pat E. McTeer; George E. Heard, both of Golden, all of Colo.

[73] Assignee: Adolph Coors Company, Golden, Colo.

[21] Appl. No.: 538,154

[22] Filed: Oct. 3, 1983

[51] Int. Cl.⁴ .............................................. B01D 13/00
[52] U.S. Cl. .................................... 210/637; 210/651; 210/195.2
[58] Field of Search ...................... 210/651, 637, 195.2, 210/433.2, 321.1, 96.2

[56] References Cited

U.S. PATENT DOCUMENTS

| | | | |
|---|---|---|---|
| 3,472,765 | 10/1969 | Budd et al. | 210/195.2 X |
| 3,998,740 | 12/1976 | Bost et al. | 210/195.2 |
| 4,276,176 | 6/1981 | Shorr | 210/637 |
| 4,411,781 | 10/1983 | Schnabel et al. | 210/195.2 |
| 4,426,293 | 1/1984 | Mason et al. | 210/195.2 X |

OTHER PUBLICATIONS

Sonksen et al., "Treatment of Oily-A Case History", Published 1979, pp. 696-705.

Primary Examiner—Frank Spear
Attorney, Agent, or Firm—Klaas & Law

[57] ABSTRACT

A system and process for processing a predominantly aqueous phase solution separated from an emulsion coolant recovered from can bodies in a can manufacturing process to recover reclaimable oil. A recirculation line is provided between an ultrafiltration device and a processing tank which receives a predominantly aqueous phase solution produced by acid cracking processing of the emulsion coolant. A substantially constant waste concentration level is maintained in the processing tank and, consequently, through an ultrafiltration device by bleeding concentrated retente from the recirculation line. The substantially constant waste concentration level extends the cleaning cycle period of the ultrafiltration device by an amount consistent with the ability to process concentrated retente bled from the recirculation line. The ultrafiltration device produces a permeate effluent which is consistent and suitable for discharge.

21 Claims, 2 Drawing Sheets

SYSTEM AND PROCESS FOR PROCESSING USED EMULSION COOLANT

BACKGROUND OF THE INVENTION

The present invention pertains generally to systems for processing emulsion coolant and more particularly to systems for processing a predominantly aqueous phase solution separated from an emulsion coolant recovered from can bodies in a can manufacturing process to recover reclaimable oil.

In the can manufacturing industry, and particularly in the aluminum beverage can manufacturing industry, cans are commonly manufactured in high speed production lines involving the steps of cupping, body making, trimming, washing, printing, internal coating and necking and flanging. In the cupping step, sheet materials, such as sheet aluminum, are lubricated with an oil and water emulsion coolant and then stamped into relatively short height and relatively large diameter cups. In the body making step, the cup is forced by a moving ram through a series of concentric ironing dies that stretch the cup to form a relatively taller height and relatively smaller diameter can body. In both the cupping and body making steps, the sheet material is covered with the coolant to lubricate the sheet material and dissipate heat generated by the process of stretching and forming the sheet material. After the can bodies have been trimmed, they are carried through a multiple stage can body washer which removes the used coolant and metal fines from the can bodies.

The used oil and water emulsion coolant recovered from the can bodies is processed for re-use to form reconstituted emulsion coolant by washing the coolant adhering to can bodies with an aqueous solution having a pH of about 2.0, as described in U.S. Pat. No. 4,027,685, issued June 7, 1977 to Heard et al., which is specifically incorporated herein by reference and forms a part of this disclosure for all that it discloses. The result is a mixture of emulsion coolant and aqueous solution which can be separated in one or more stages by heating the mixture to elevated temperatures sufficient to break a substantial portion of the emulsion into a predominantly hydrocarbon phase and a predominantly aqueous phase. The predominantly hydrocarbon phase can then be reconstituted to form an emulsifiable oil. The separated predominantly aqueous phase can be heated in subsequent stages to even higher temperatures to further separate an additional predominantly hydrocarbon phase from an additional predominantly aqueous phase or simply allowed to stand in a retention tank to allow further separation of the predominantly hydrocarbon and aqueous phases. The remaining additional predominantly aqueous phase is then normally subjected to a polymer treatment process, such as a dissolved air flotation process, in which anionic and cationic polymers attach to oil, grease, metals, suspended solids, and other waste materials, to form a sludge for solid waste disposal.

The disadvantage of such a treatment process is that a large amount of reclaimable oil is processed into sludge which produces a large volume of material for solid waste disposal. Additionally, polymer treatment costs are substantial because of the amount of oil which must be removed from the additional predominantly aqueous phase solution. Also, oil removed from the additional predominantly aqueous phase solution by the polymer treatment process essentially cannot be reclaimed from the sludge because of the manner in which the polymers are attached to the oils. Consequently, conventional processes of removing oil from predominantly aqueous phase solutions, even after several acid cracking steps, results in an expensive polymer treatment process which produces a large volume of sludge for solid waste disposal. Moreover, the sludge produced cannot be reclaimed in a manner to offset costs of the treatment process.

These problems have been overcome by the use of ultra-filtration and reverse osmosis processes wherein oily waste waters produced in various industries are accumulated in a process tank and circulated between a filtration processing system and a process tank to significantly reduce the volume of waste liquid by removing a filtered effluent (permeate) which is suitable for discharge. The concentrate (retente) from the ultra-filtration process is circulated back into the process tank to increase the waste concentration level. When the volume of waste fluid is decreased significantly, it is removed and sold to local scrap reclaimers.

This system has the advantage of eliminating treatment costs associated with polymer treatment processes and producing a permeate effluent which is suitable for disposal. The filtration process provides a consistent oil waste concentration level in the permeat effluent which does not vary with the concentration of the effluent being filtered. However, the process utilized does not allow for direct oil recovery from the concentrated waste fluid. Additionally, since batch processing is used in conventional filtration processes as described above, waste concentration levels progressively increase during the process. This causes the frequency of the filter cleaning cycle to be significantly increased.

OBJECTS OF THE INVENTION

It is therefore an object of the present invention to provide an improved system for processing used emulsion coolant.

It is also an object of the present invention to provide an improved system for processing a predominantly aqueous phase solution separated from an emulsion coolant.

Another object of the present invention is to provide an improved system for processing a predominantly aqueous phase solution separated from an emulsion coolant used in a can manufacturing process.

Another object of the present invention is to provide an improved system for processing a predominantly aqueous phase solution separated from an emulsion coolant utilized to process metal to enhance oil recovery from said emulsion coolant, reduce polymer treatment costs, produce an effluent having consistent waste concentration levels suitable for discharge and reduce solid waste disposal volume.

Another object of the present invention is to provide a system for processing used emulsion coolant recovered from can bodies in a can manufacturing process and treating a predominantly aqueous fluid which has been separated from the predominantly hydrocarbon phase fluid in a continuous flow process to recover reclaimable oil.

Another object of the present invention is to provide a process for reclaiming oil from a predominantly aqueous phase solution separated from an emulsion coolant used during metal processing.

Additional objects, advantages and novel features of the present invention are set forth in part in the description which follows and may be understood by those skilled in the art upon examination of the following or may be learned by practice of the invention. The objects and advantages of the invention may be realized and obtained by means of the instrumentalities and combinations which are particularly pointed out in the appended claims.

SUMMARY OF THE INVENTION

The present invention overcomes the disadvantages and limitations of the prior art by providing a system for processing a predominantly aqueous phase solution separated from an emulsion coolant utilized to process metal to enhance oil recovery from the emulsion coolant, reduce polymer treatment costs, produce an effluent having consistent waste concentration levels suitable for discharge and reduce solid waste disposal volumes. This is achieved by utilizing a process tank for forming a reservoir of the predominantly aqueous solution and filtering the predominantly aqueous solution utilizing an ultra-filtration process to produce a concentrated predominantly aqueous solution and an effluent having a consistent waste concentration level suitable for discharge regardless of the waste concentration levels in the process tank. Recirculation means are provided for recirculating the concentrated predominantly aqueous solution from the ultra-filtration means to increase the waste concentration level in the process tank. Regulating means are also provided for removing a portion of the concentrated predominantly aqueous solution from the recirculating means at a predetermined bleed flow rate suitable to produce a process tank waste concentration level which simultaneously optimizes both the bleed flow rate and the cleaning cycle of the filter to decrease the volume of the concentrated predominantly aqueous solution for further processing and increase the filter cleaning period to a desired level.

The present invention may further comprise processing means for recovering reclaimable oil from the concentrated predominantly aqueous solution and polymer means for processing predominantly water phase fluid produced by the processing means to produce an effluent suitable for liquid discharge and a sludge suitable for solid waste disposal, such that polymer treatment costs and solid waste disposal amounts are reduced by the amount of the reclaimable oil phase removed from the concentrated predominantly aqueous phase solution.

BRIEF DESCRIPTION OF THE DRAWINGS

An illustrative and presently preferred embodiment of the invention is shown in the accompanying drawing in which.

DETAILED DESCRIPTION OF THE INVENTION

Figure 1:
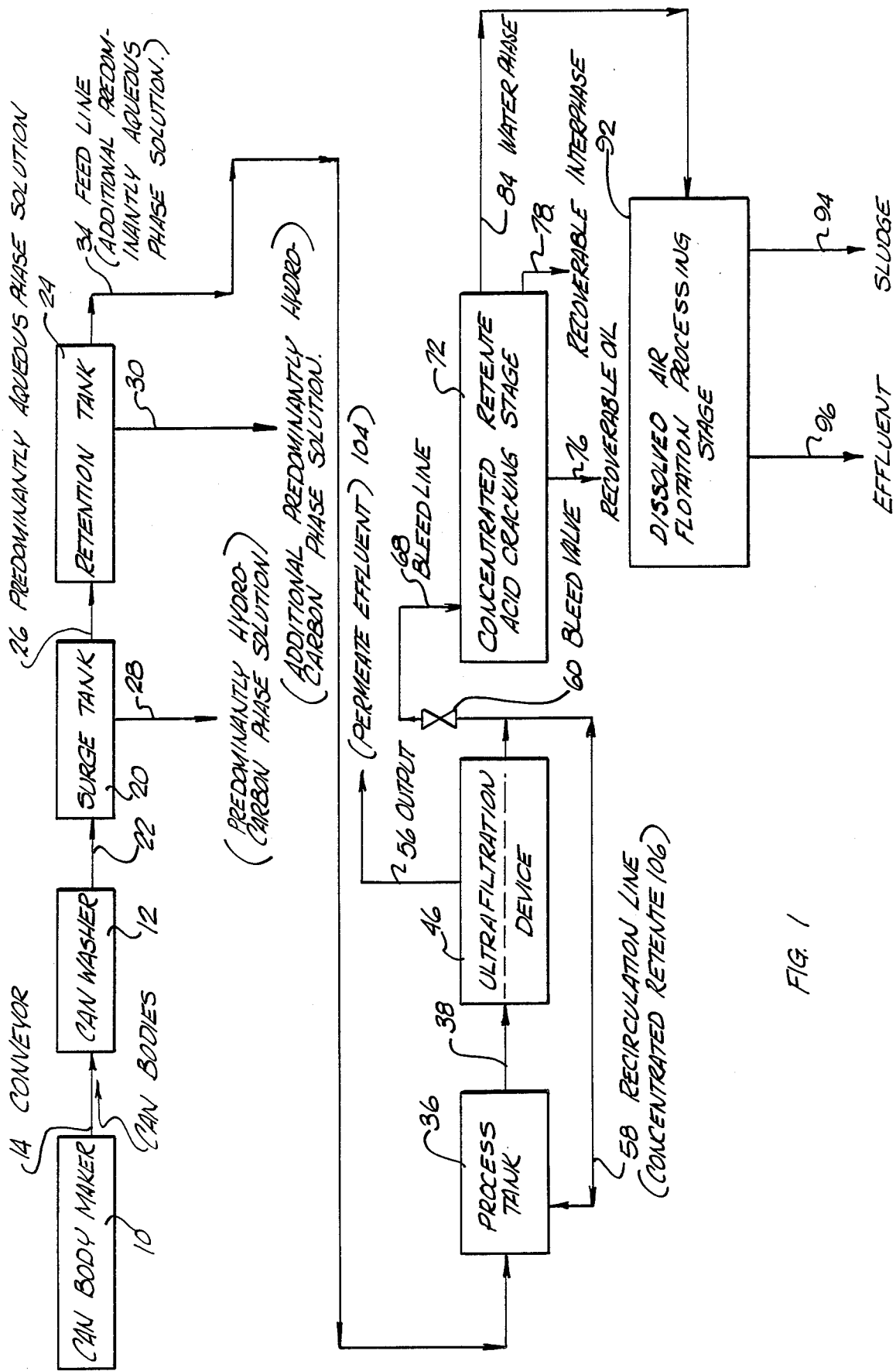
FIG. 1 is a block diagram illustrating the process of the present invention.

FIG. 1 discloses a schematic block diagram of the system of the present invention. Can body maker 10 uses an oil and water emulsion coolant to coat the can bodies during the manufacturing process. Various emulsion coolants useful in accordance with the present invention are disclosed in above referenced patent issued to Heard et al. Emulsion coolants containing lubricants and heat dissipaters are used by the can manufacturing apparatus during formation of can bodies from sheet metals. The coolant is applied to the sheet metal prior to the cupping and body making steps of the can manufacturing process. After trimming of the can bodies, the coolant must be removed prior to further processing of the can bodies, i.e., application of decorative paint layers and overvarnish layers. The emulsion coolant is recovered by washing the coolant adhering to the can bodies in an aqueous solution in multi-stage can washer 12. The aqueous solution has a pH of less than approximately 2.0 such that the resultant fluid recovered from can washer 12 at output 22 comprises an emulsion coolant and aqueous solution.

This mixture is then supplied to surge tank 20 for processing. The aqueous wash solution and recovered oil and water emulsion coolant recovered from can washer 12 is heated to an elevated temperature level of approximately 70° to 120° F. in surge tank 20, which is sufficient to break a substantial portion of the oil and water emulsion coolant into a predominantly hydrocarbon phase and a predominantly aqueous phase. The mixture is then allowed to settle in surge tank 20 for a sufficient period of time to allow at least a portion of the predominantly aqueous phase to settle from the predominantly hydrocarbon phase due a difference in specific gravities and chemistry between the two phases. The predominantly hydrocarbon phase is then separated from the predominantly aqueous phase as, for example, by skimming the predominantly hydrocarbon phase from the predominantly aqueous phase, or by draining the aqueous phase from the bottom of the settling tank. The separated predominantly aqueous phase solution is then transferred to retention tank 24 by output 26 from surge tank 20. The predominantly hydrocarbon phase fluid is removed from the first acid cracking stage by output 28.

In the retention tank 24, the predominantly aqueous phase is allowed to settle for an additional period of time to allow additional oil to be separated from the predominantly aqueous phase to form an additional predominantly hydrocarbon phase and an additional predominantly aqueous phase. The additional predominantly aqueous phase and additional predominantly hydrocarbon phase are separated in the same manner as in surge tank 20. The additional predominantly hydrocarbon phase produced by retention tank 20 is removed by output 30. The additional predominantly aqueous phase solution produced by retention tank 24 is transferred by feed line 34 to process tank 36.

The additional predominantly aqueous phase solution transferred to process tank 36 by feed line 34 contains a number of waste products including metal salts, such as aluminum salts, and other products, such as surfactants, oil and grease and various suspended solids. Additionally, the solution has a pH level which is unsuitable for discharge. Consequently, the additional predominantly aqueous solution is accumulated in process tank 36 as it is produced by second cracking stage 24. The solution in process tank 36 is pH adjusted to 7-8.

The output 38 of process tank 36 is connected to an ultra-filtration device 46. Ultrafiltration device 46 can comprise a series of ultra-filtration stages with suitable flow control devices to allow the system illustrated in FIG. 1 to be operated on a continuous flow basis.

Figure 2:
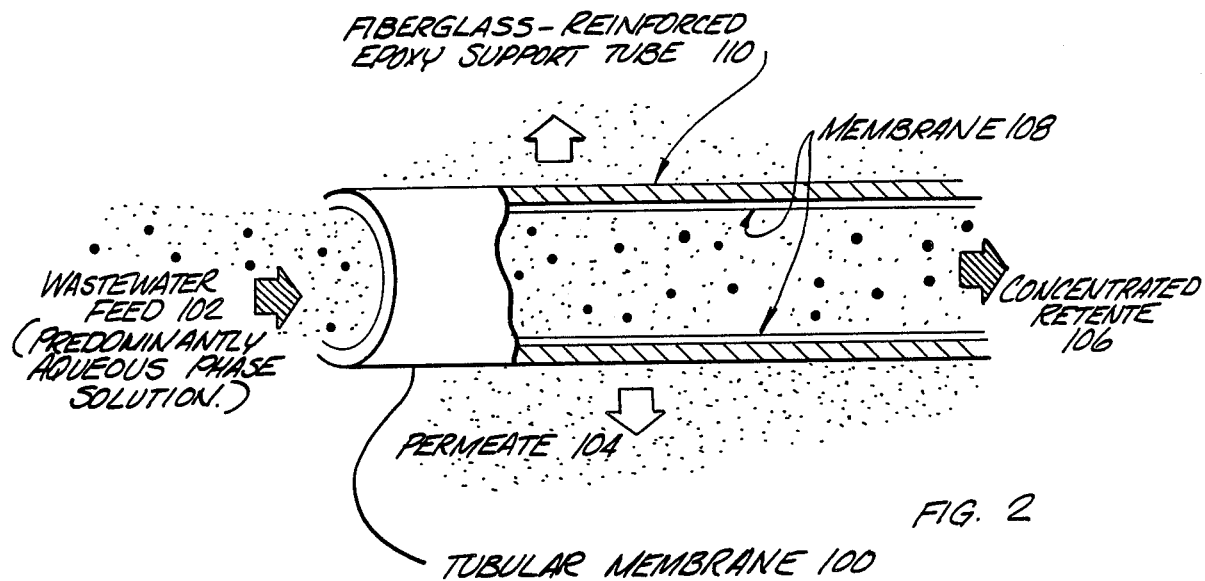
FIG. 2 is a schematic diagram of a typical tubular ultra-filtration module utilized in accordance with the present invention.

Ultra-filtration device 46 uses a tubular membrane device 100, such as illustrated in FIG. 2. Ultrafiltration is a low pressure membrane process for separating emulsified oil and suspended solids from waste water. In an ultra-filtration system, a waste feed 102, such as the predominantly aqueous phase solution from process tank 36, is introduced into a tubular membrane 100. Water and low molecular waste solutes, e.g., salts and surfactants, pass through the membrane and are removed as a permeate 104, which constitutes the filtered effluent. Emulsified oils and suspended solids are retained in the membrane and are removed as a concentrated retente 106. During ultra-filtration, waste water feed 102 flows across the membrane surface as compared to the perpendicular flow of ordinary filtration. Consequently, filter cake build-up occurs at a slower rate so that permeate flux rates may be maintained for longer periods.

As illustrated in FIG. 2, membrane 108 comprises a thin film of non-cellulosic polymer that is capable of withstanding high operating temperatures, and extremes in pH and solvent exposure. Membrane 108 is a thin surface layer of less than 0.5 microns which covers a highly porous structure. The combination of the thin surface and highly porous structure gives the ultra-filtration membrane 108 a low resistance to permeate flow, permitting low pressure operation. Membrane 108 has a pore opening of less than 0.005 microns, which is significantly smaller than emulsified oil droplets and suspended solids so as to prevent pore plugging. Membrane 108 is cast onto the inside of a porous fiber-glass reinforced epoxy support tube 110. In typical designs, the support tube is 1 inch in diameter and 10 feet long. The tube 100 fits into a permeate collection shell having seals at each end of the support tubes which isolate the permeate 104 from the oily waste water. The tubular modules, as illustrated in FIG. 2, can be connected in series or parallel flow arrangements to meet the required waste water treatment capacity. Suitable ultra-filtration tubular membranes and ultrafiltration devices for use with the present invention can be obtained from Abcor, 850 Main Street, Wilmington, Ma. 01887.

The permeate effluent 104 is emitted from ultra-filtration device 46 at output 56 and suitably discharged. The permeate effluent 104 produced by the ultra-filtration device 46 has a consistent waste concentration level which does not vary with the waste concentration level of the predominantly hydrocarbon phase solution stored in process tank 36. Additionally, the permeate effluent 104 produced by ultra-filtration device 46 is suitable for discharge, i.e., waste concentration levels are sufficiently low to discharge into a water supply such as a river, stream, lake, etc. The consistency of the permeate effluent 104 provides for a reliable and consistent process of eliminating large volumes of water from the predominantly aqueous phase solution 102.

Concentrated retente 106 is recirculated from the ultra-filtration device 46 to process tank 36 by recirculation line 58. A portion of the concentrated retente is bled or removed from recirculation line 58 by bleed valve 60 disposed in bleed line 68. The bleed flow rate is controlled by bleed valve 60. Bleed valve 60 can be either manually or automatically controlled to maintain a suitable level in process tank 36, as well as maintaining a suitable bleed rate consistent with the parameters of the system. Concentrated retente bled from recirculation line 58 is processed in a concentrated retente acid cracking stage 72 which can comprise two or more acid cracking processing tanks to provide a continuous flow process.

Acid cracking stage 72 uses a process of heating, mixing and acidifying the concentrated waste bled from the recirculation line 58 such as disclosed in the prior art. The amount which is bled from recirculation line 58 by valve 60 is used to control the waste concentration level of the predominantly aqueous phase solution stored in process tank 36. The waste concentration level of the predominantly aqueous phase solution produced by second acid cracking stage 24 is significantly lower than the waste concentration level of the concentrated retent 106 produced by ultra-filtration device 46 and recirculated by recirculation line 58. Consequently, the waste concentration level in process tank 36 can be raised in accordance with the amount of concentrated retente 106 fluid bled from recirculation line 58 by bleed line 68 via bleed valve 60.

Control of the waste concentration level in process tank 36 provides a process for increasing the filter cleaning cycle of the ultra-filtration device 46. Waste concentration levels in the range of 15-20% cause the filter cleaning cycle i.e., the period of time between cleaning of the filter to maintain a suitable permeate flux rate, to be reduced to several hours. Waste concentration levels in the range of 5-10%, however, produce a filter cleaning cycle having a length of several days or more. Consequently, bleed valve 60 can be adjusted to adjust the bleed flow rate to maintain a predetermined waste concentration level in the process tank to either lengthen or shorten the filter cleaning cycle to a desired level which is consistent with the amount of bleed to be processed in concentrated retente acid cracking stage 72.

The process of heating, mixing and acidifying the concentrated retent 106 is performed in the concentrated retente acid cracking stage 72 produces separated recoverable oil 76, recoverable interphase material 78 and water phase material 84. Separated recoverable oil 76, recoverable interphase 78 and water phase 84 are removed from the acid cracking stage by skimming and/or draining, in the same manner the predominantly aqueous phase solution and predominantly hydrocarbon phase material are separated in surge tank 20 and retention tank 24. The acid cracking process of the concentrated retente acid cracking stage 72 uses sulfuric and hydrofloric acid having a high concentration level which are mixed in the heated solution and allowed to stand for several hours. This produces an oily layer on the top of the tank which comprises recoverable oil 76 and an interphase material 78 between the recoverable oil layer 76 and the water phase material 84. The recoverable oil phase material 76 and interphase material 78 can be reprocessed for further use or marketed to reprocessed oil manufacturers.

Water phase material 84 removed from the acid cracking stage 72 is processed in dissolved air flotation processing stage 92 to produce an effluent 96 suitable for discharge and a sludge 94 which is suitable for solid waste disposal, or burning. The dissolved air flotation process stage 92 uses conventional polymer treatment processes, such a disclosed in EPA Manual 430/978001, Performance Evaluation and Trouble-Shooting at Municipal Waste Treatment Facilities, Section 4, PP. 287-294, Gordon Culp and Nancy Heim, January, 1978, for removing oil and grease and other waste products from the water phase material 84 produced in response to the acid cracking process performed in concentrated retente acid cracking stage 72.

The process of the present invention can be carried out at various processing scales to process a wide range of flow rates of predominantly aqueous phase solution having various concentration levels. For example, the present invention could be used in conjunction with a process tank 36 having a volume of 5,000 gallons which receives 100 gallons per minute of predominantly aqueous phase solution having 3,000 parts per million of grease and oil at a normality of 2 to 3 pH. The influent would therefore provide: 100 gal./min.×3,000 parts/million (0.03%)=0.3 gal. of oil/min.

Assuming that the ultrafiltration filters are capable of consistently producing a concentrated waste having a waste concentration level of 20%, the influent of gallons of oil per minute divided by the percentage of concentrated waste equals the bleed rate which must be produced to maintain a constant waste concentration level in process tank 36. In the present hypothetical example, an ineffluent rate of 0.3 gallons of oil per minute divided by a 20% waste concentration level produces a bleed flow rate of 1.5 gallons per minute to maintain a constant waste concentration level in process tank 36.

To produce a constant concentrated waste level from ultrafiltration device 46, a predetermined waste concentration level must be maintained in process tank 36. Of course, the waste concentration level produced by ultrafiltration device 46 is dependent upon the particular ultrafiltration filter used. Ultrafiltration filters, such as the HFP-276 produced by Abcor, are capable of producing a concentrated retente 106 having a concentration level of 20% by maintaining a constant waste concentration level in waste water feed 102 of approximately 5%. A desired waste concentration level is produced in process tank 36 by allowing the process to run and recirculate concentrated retente 106 on recirculation line 58 without bleeding off any of the concentrated retent 106 until the concentrated waste level reaches the desired level in process tank 36, e.g., 5%. At that point, a bleed flow rate of 1.5 gallons per minute through valve 60 can be produced to maintain a constant waste concentration level in process tank 36.

As can be readily seen, the bleed flow rate is dependent upon the waste concentration level and feed rate of the predominantly aqueous phase solution being fed into process tank 36 by feed line 34 and the waste concentration level of concentrated retente 106 which varies with the waste concentration level maintained in process tank 36. If either the feed rate or waste concentration level of either feed lines 34 or 38 changes, the bleed flow rate established by valve 60 must be adjusted to maintain a constant oil waste concentration in process tank 36. Since a steady state process is produced between feed line 34, and output 56 and bleed line 60, in the present hypothetical example output 56 necessarily produces a permeate effluent rate of 98.5 gallons per minute in response to the feed rate of 100 gallons per minute on feed line 34 and a 1.5 gallon per minute bleed rate on bleed line 68. By maintaining a waste concentration level of approximately 5% in the process tank 36, the cleaning cycle for the ultrafiltration device 46 is several days. This comprises a substantial improvement over prior art batch processing methods which employ a progressively increasing waste concentration level in the process tank resulting in a cleaning cycle of several hours.

The acid cracking process used to separate recoverable oil 76 and recoverable interphase 78 from water phase material 84 utilizes concentrated sulfuric acid and concentrated hydrofloric acid which is mixed with 2,500 to 3,000 gallons of concentrated waste in an acid cracking processing tank. The mixture is heated to 130° F. to 150° F. and mixed with a mechanical mixer for approximately 15 minutes to one hour. Sufficient sulfuric acid and hydrofloric acid is used to drop the pH level below 1.5 pH to achieve proper results in the acid cracking process of acid cracking stage 72. Typically, 8 gallons of sulfuric acid having a concentration of less than 1.5 pH and 2 to 4 gallons of hydrofluoric acid having a concentration of approximately 19 molar are combined with the concentrated retent 106 in acid cracking stage 72 to achieve the proper pH level in the acid cracking processing tank. After sufficient mixing, the solution is allowed to settle in the acid cracking processing tank of acid cracking stage 72 for a period of 2 to 4 hours. The recoverable oil 76 and recoverable interphase 78 can then be removed as described above. The water phase material is then processed in the dissolved air flotation process of dissolved air flotation processing stage 92 to remove remaining oil in the form of sludge 94 and an effluent 96 suitable for discharge.

EXAMPLE

Incoming predominantly aqueous phase solution was processed which contained oil and grease levels of 100 ppm to 50,000 ppm using an Abcor UF-70 unit which yielded a permeate with less than 50 ppm oil and grease and typically less than 30 ppm. Three different membranes were used during testing. The HFP-276 membrane produced the best results in removing of ppm oil and grease, providing operating longevity, and regeneration of the membrane. Operating temperatures of the test ranged from 80° F. to 100° F. Higher temperatures resulted in higher flux rates. The pH of the predominantly aqueous phase solution was adjusted to 7-8. This range provided the highest flux rate and a permeate with the least amount of contaminant. Permeate flux rates ranged between greater than 5.0 gallons per minute to approximately 3.0 gallons per minute.

Table 1 comprises a compilation of test data taken on an hourly basis on pH adjusted waste water. The pH was maintained between 7-8 with three occurrences of pH dipping to the range of 6.5-7.0 pH. As indicated in Table 1, a steady decline in permeate flux rate was observed from the start to the finish of the test. The test was terminated when the permeate flux rate dropped below 3.0 gallons per minute. This occurred in 54 hours of continuous processing of predominantly aqueous phase solution. During the test, 12,042 gallons of waste water was processed which was reduced to a volume of 230 gallons of concentrate. This constituted a 98.1% reduction in volume. The concentrated waste produced during the test contained suspended solids and oils. The incoming predominantly aqueous phase solution contained oil and grease in a range of 384 parts per million to 10,089 parts per million. The effluent oil and grease contained less than 25 parts per million.

TABLE 1

| Time | Pressure in/out (psig) | Temp (f) | pH | Pass I HFP/276 (gpm) | Pass II HFM/251 (gpm) | Pass III UCM-251 (gpm) | Pass IV UCM-251 (gpm) | Perm. Flow (gpm) | Comments |
|---|---|---|---|---|---|---|---|---|---|
| 8:00 AM | 63/12.5 | 100 | — | 1.70 | 1.98 | 2.02 | 2.14 | NA | |
| 8:15 AM | 64/16.0 | 65 | 7.40 | 1.14 | 1.24 | 1.25 | 1.30 | 6.0+ | Start of test |
| 8:25 AM | ND* | ND* | ND* | ND* | ND* | ND* | ND* | ND* | Continuous flow for Make-up |
| 9:15 AM | 64/13.5 | 78 | 8.27 | .94 | .64 | .68 | .78 | 3.4 | pH droppped to 6.03 at 8:45 AM |
| 10:10 AM | 64/13.5 | 83 | 7.13 | .68 | .66 | .72 | .76 | 3.1 | |
| 11:10 AM | 64/13.5 | 83 | 7.20 | .81 | .75 | .86 | .86 | 3.6 | |
| 12 Noon | 63.5/12.0 | 84 | 7.06 | .95 | .77 | .94 | .96 | 4.0 | |
| 1:00 PM | 64/13.0 | 80 | 7.39 | .94 | .72 | .98 | .99 | 4.1 | |
| 2:00 PM | 64/13.0 | 81 | 7.4 | 1.00 | .72 | .95 | .95 | 4.1 | |
| 2:36 PM | ND* | ND* | ND* | ND* | ND* | ND* | ND* | 3.6 | pH dropped again |
| 3:00 PM | 64/14.0 | 83 | 7.14 | .84 | .64 | .82 | .83 | 3.6 | |
| 4:00 PM | 64/14.0 | 84 | 7.66 | .87 | .63 | .84 | .82 | 3.5 | |
| 5:00 PM | 64/14.0 | 84 | 7.32 | .90 | .67 | .85 | .88 | 3.6 | |
| 6:00 PM | 64/14.0 | 84 | 7.26 | 1.01 | .70 | .93 | .94 | 3.9 | |
| 7:00 PM | 64/14.0 | 84 | 7.24 | 1.04 | .69 | .93 | .94 | 3.9 | |
| 8:00 PM | 64/14.0 | 84 | 7.5 | 1.08 | .68 | .95 | .75 | 4.0 | |
| 9:00 PM | 64/14.0 | 83 | 7.33 | 1.11 | .68 | .94 | .95 | 4.0 | |
| 10:00 PM | 64/14.0 | 82 | 7.70 | 1.13 | .68 | .94 | .94 | 4.0 | |
| 11:00 PM | 64/14.0 | 82 | 7.30 | 1.13 | .67 | .92 | .92 | 3.9 | |
| 12:00 M | 64/14 | 83 | 7.5 | 1.13 | .68 | .94 | .94 | 4.0 | |
| 1:00 AM | 64/14 | 83 | 7.5 | 1.13 | .68 | .94 | .96 | 4.0 | |
| 2:00 AM | 64/14 | 84 | 7.6 | 1.13 | .67 | .94 | .96 | 4.0 | |
| 2:45 AM | 64.5/14.5 | 82 | 7.4 | 1.16 | .70 | .92 | .95 | 4.1 | 1.7% solids |
| 4:00 AM | 64.5/14.5 | 80 | 7.6 | 1.14 | .69 | .90 | .92 | 4.1 | |
| 5:00 AM | 64.5/14.5 | 82 | 6.95 | 1.10 | .65 | .89 | .92 | 4.0 | |
| 6:00 AM | 64.5/14.5 | 84 | 7.2 | 1.12 | .65 | .90 | .92 | 4.1 | |
| 6:50 AM | 64.5/14.5 | 86 | 7.9 | 1.14 | .67 | .92 | .95 | 4.1 | |
| 8:30 AM | 64.5/14.5 | 86 | 7.9 | 1.17 | .67 | .90 | .94 | 4.1 | |
| 9:00 AM | 64.5/14.5 | 85 | 8.2 | 1.19 | .64 | .89 | .92 | 4.1 | |
| 11:00 AM | 64.5/14.5 | 84 | 8.0 | 1.16 | .62 | .86 | .89 | 3.9 | 2.8% solids |
| 12:30 PM | 64.5/14.5 | 86 | 6.8 | 1.07 | .57 | .86 | .88 | 3.75 | |
| 1:00 PM | 64.5/14.5 | 86 | 7.1 | 1.06 | .60 | .88 | .88 | 3.75 | |
| 2:00 PM | 64.5/14.5 | 87 | 7.4 | 1.14 | .59 | .88 | .92 | 3.8 | |
| 3:30 PM | 64.5/14.5 | 84 | 7.5 | 1.11 | .57 | .84 | .86 | 3.75 | |
| 5:00 PM | 64.5/14.5 | 84 | 7.4 | 1.11 | .56 | .84 | .86 | 3.7 | |
| 7:00 PM | 64.5/14.5 | 87 | 7.3 | 1.08 | .56 | .85 | .86 | 3.7 | 3.2% solids |
| 8:00 PM | 64.5/14.5 | 87 | 7.3 | 1.08 | .54 | .84 | .85 | 3.6 | |
| 10:00 PM | 64.5/14.5 | 85 | 7.7 | 1.08 | .54 | .83 | .84 | 3.6 | |
| 12:00 M | 64.5/14.5 | 85 | 7.6 | 1.08 | .54 | .82 | .85 | 3.6 | |
| 1:30 AM | ND* | ND* | ND* | ND* | ND* | ND* | ND* | 3.5 | Tank overflowed 25–30 gallons |
| 2:00 AM | 64.5/14.5 | 84 | 7.45 | 1.05 | .48 | .77 | .77 | 3.4 | |
| 2:30 AM | 64.5/14.5 | 83 | 8.04 | 1.05 | .48 | .74 | .76 | 3.5 | |
| 3:30 AM | 64.5/14.2 | 83 | 7.91 | 1.05 | .48 | .75 | .77 | 3.5 | |
| 4:15 AM | 64/14.1 | 83 | 7.82 | 1.02 | .45 | .73 | .78 | 3.4 | |
| 5:15 AM | 64.5/14.5 | 81 | 7.90 | 1.03 | .45 | .72 | .74 | 3.4 | |
| 6:15 AM | 64.5/14.5 | 83 | 7.70 | 1.05 | .44 | .71 | .74 | 3.3 | |
| 7:15 AM | 64.5/14.5 | 85 | 7.73 | 1.05 | .43 | .70 | .73 | 3.3 | |
| 8:30 AM | 64.5/14.5 | 87 | 7.26 | 1.05 | .42 | .69 | .72 | 3.2 | Concentrate 3.9% solids |
| 9:30 AM | 64.5/14.5 | 88 | 7.56 | 1.06 | .42 | .69 | .72 | 3.4 | |
| 10:30 AM | 64.5/14.5 | 87 | 7.76 | 1.07 | .42 | .69 | .72 | 3.3 | |
| 12 Noon | 64.5/14.5 | 85 | 8.28 | 1.06 | .42 | .69 | .72 | 3.3 | |
| 2:00 PM | 64.5/14.5 | 84 | 7.86 | 1.03 | .40 | .65 | .68 | 3.1 | Concentrate 4.4% solids Volume reduction of 98.1% |

Total hours ran = 54
*No Data

Consequently, the present invention provides a system for processing a predominantly aqueous phase solution separated from an emulsion coolant utilized to process metal to enhance oil recovery from the emulsion, reduce polymer treatment costs, produce an effluent having consistent waste concentration levels suitable for discharge regardless of concentration levels of the system, reduce solid waste disposal volumes and provides an optimized cleaning cycle period consistent with the parameters of the system. This is achieved in a system in which oil recovery offsets processing costs to provide a short return on investment.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. In a system for processing used emulsion coolant recovered from can bodies in a can manufacturing process, a system for treating a predominantly aqueous phase solution in a continuous flow process to recover reclaimable oil comprising:

process tank means for accumulating said predominantly aqueous phase solution;

ultrafiltration means coupled to said process tank means for producing an effluent permeate from said predominantly aqueous phase fluid at a predetermined flux rate, and a predetermined waste concentration level suitable for disposal, and a concentrated retente having a waste concentration level substantially greater than the waste concentration level of said predominantly aqueous phase solution;

recirculation means coupled between said process tank means and said ultrafiltration means for recirculating said concentrated retente from said ultrafiltration means to said process tank means to increase waste concentration levels in said process tank to a predetermined substantially constant waste concentration level;

bleed means for removing a portion of said concentrated retente at a predetermined bleed flow rate sufficient to maintain said waste concentration levels in said process tank at said predetermined substantially constant waste concentration level to produce an optimized filter cleaning cycle for said ultrafiltration means while maintaining said predetermined bleed flow rate sufficiently low to enable processing of said concentrated retente;

processing means for recovering said reclaimable oil from said concentrated retente received from said bleed means.

2. The system of claim 1 wherein said predetermined substantially constant waste concentration level of said predominantly aqueous solution in said process tank means is approximately 8% to 10%.

3. The syste of claim 1 wherein said predetermined substantially constant waste concentration level in said process tank means is approximately 5% to 10%.

4. The system of claim 3 wherein said bleed means comprises an automatic control valve.

5. The system of claim 4 wherein said processing means comprises:

acid cracking means for separating said concentrated retente into reclaimable oil, interphase and water phase;

polymer treatment means for removing waste from said water phase and producing sludge for solid waste disposal.

6. The system of claim 5 wherein said acid cracking means comprises means for heating, mixing and acidifying said concentrated retente with sulfuric and hydrofloric acid.

7. The system of claim 6 wherein said polymer treatment means comprises dissolved air flotation means which uses a polymer treatment to waste concentration levels in said water phase to levels suitable for discharge of said water phase.

8. A system for processing a predominantly aqueous solution separated from an emulsion coolant utilized to process metal comprising:

process tank means for forming a reservoir of said predominantly aqueous solution having a predetermined process tank waste concentration level;

ultrafiltration means for filtering said predominantly aqueous solution from said process tank means to produce a concentrated retente and an effluent permeate of predominantly aqueous solution said effluent being discharged at a predetermined effluent flux rate having a consistent effluent waste concentration level suitable for discharge regardless of said process tank waste concentration level, said ultrafiltration means having a filter cleaning cycle necessary to substantially maintain said predetermined effluent flux rate which varies with said process tank waste concentration level;

recirculation means for recirculating said concentrated retente from said ultrafiltration means to said process tank means to increase said process tank waste concentration level;

regulating means for removing a portion of said concentrated predominantly aqueous solution from said recirculating means at a predetermined bleed flow rate suitable to produce a substantially constant process tank waste concentration level which simultaneously optimizes both said bleed flow rate and said filter cleaning period to decrease the volume of said concentrated predominantly aqueous solution and increase said filter cleaning cycle to a desired level.

9. The system of claim 8 further comprising:

processing means for recovering a reclaimable oil phase, a reclaimable interphase and a predominantly water phase from said concentrated predominantly aqueous solution;

polymer treatment means for processing said predominantly water phase to produce an effluent suitable for liquid discharge and a sludge suitable for solid waste disposal such that polymer treatment costs and solid waste disposal amounts are reduced by the amount of reclaimable oil phase and reclaimable interphase material removed from said concentrated predominantly aqueous solution by said processing means.

10. The system of claim 8 wherein said processing means comprises:

acid cracking means comprises means for heating, mixing and acidifying said concentrated retente with sulfuric and hydrofloric acid.

11. The system of claim 10 wherein said polymer treatment means comprises dissolved air flotation means which uses a polymer treatment to reduce aluminum and oil concentration levels in said water phase to levels suitable for discharge of said water phase.

12. A process of reclaiming oil from a predominantly aqueous solution separated from an emulsion coolant used during metal processing comprising the steps of:

accumulating said predominantly aqueous solution in a process tank;

filtering said predominantly aqueous solution in an ultrafiltration process to produce an effluent permeate with a consistent waste concentration level suitable for discharge and for producing a concentrated retente;

recirculating said concentrated retente to said process tank to increase waste concentration levels in said process tank;

removing a portion of said concentrated retente at a predetermined flow rate to increase the cleaning cycle of filters used in said ultrafiltration process to a desirable length by maintaining a predetermined substantially constant waste concentration level in said process tank while producing a flow rate suitable for further processing of said concentrated retente.

13. The process of claim 12 comprising the further step of:

recovering reclaimable oil from said concentrated retente and producing a predominantly water phase waste material.

14. The process of claim 13 comprising the further steps of:

processing said predominantly water phase material by a polymer treatment process to produce an effluent suitable for liquid discharge and a sludge suitable for solid waste disposal.

15. In a system for processing used emulsion coolant recovered from can bodies in a can manufacturing process, a system for treating a predominantly aqueous phase solution in a continuous flow process to recover reclaimable oil comprising:

process tank feed means for feeding a predominantly aqueous phase solution to a process tank means;

process tank means for accumulating said predominantly aqueous phase solution;

ultrafiltration means coupled to said process tank means for producing an effluent permeate from said predominantly aqueous phase fluid at a predetermined flux rate and a predetermined waste concentration level suitable for disposal, and a concentrated retente having a waste concentration level substantially greater than the waste concentration level of said predominantly aqueous phase solution;

recirculation means coupled between said process tank means and said ultrafiltration means and isolated from said process tank feed means for recirculating said concentrated retente from said ultrafiltration means to said process tank means to increase waste concentration levels in said process tank to a predetermined substantially constant waste concentration level;

bleed means connected to said recirculation means and isolated from said process tank feed means for removing a portion of said concentrated retente at a predetermined bleed flow rate sufficient to maintain said waste concentration levels in said process tank at said predetermined substantially constant waste concentration level to produce an optimized filter cleaning cycle for said ultrafiltration means while maintaining said predetermined bleed flow rate sufficiently low and at a sufficiently constant concentration level to enable efficient processing of said concentrated retente;

processing means for recovering said reclaimable oil from said concentrated retente received from said bleed means.

16. The system of claim 15 wherein said predetermined substantially constant waste concentration level of said predominantly aqueous solution in said process tank means is approximately 8% to 10%.

17. The system of claim 15 wherein said predetermined substantially constant waste concentration level in said process tank means is approximately 5% to 10%.

18. The system of claim 17 wherein said bleed means comprises an automatic control valve.

19. The system of claim 18 wherein said processing means comprises:

acid cracking means for separating said concentrated retente into reclaimable oil, interphase and water phase;

polymer treatment means for removing waste from said water phase and producing sludge for solid waste disposal.

20. The system of claim 19 wherein said acid cracking means comprises means for heating, mixing and acidifying said concentrated retente with sulfuric and hydrofloric acid.

21. The system of claim 20 wherein said polymer treatment means comprises dissolved air flotation means which uses a polymer treatment to reduce waste concentration levels in said water phase to levels suitable for discharge of said water phase.

* * * * *